(12) United States Patent
Verma et al.

(10) Patent No.: US 11,308,146 B2
(45) Date of Patent: Apr. 19, 2022

(54) CONTENT FRAGMENTS ALIGNED TO CONTENT CRITERIA

(71) Applicant: Adobe Inc., San Jose, CA (US)

(72) Inventors: Gaurav Verma, Bangalore (IN); Suryateja B V, Hubbali (IN); Samagra Sharma, Guna (IN); Balaji Vasan Srinivasan, Bangalore (IN)

(73) Assignee: Adobe Inc., San Jose, CA (US)

(*) Notice: Subject to any disclaimer, the term of this patent is extended or adjusted under 35 U.S.C. 154(b) by 153 days.

(21) Appl. No.: 16/809,222

(22) Filed: Mar. 4, 2020

(65) Prior Publication Data
US 2021/0279269 A1    Sep. 9, 2021

(51) Int. Cl.
| | | |
|---|---|---|
| G06F 16/48 | (2019.01) | |
| G06F 40/30 | (2020.01) | |
| G06F 16/2457 | (2019.01) | |
| G06F 16/44 | (2019.01) | |
| G06F 16/435 | (2019.01) | |

(52) U.S. Cl.
CPC ........ G06F 16/48 (2019.01); G06F 16/24578 (2019.01); G06F 16/435 (2019.01); G06F 16/44 (2019.01); G06F 40/30 (2020.01)

(58) Field of Classification Search
None
See application file for complete search history.

(56) References Cited

U.S. PATENT DOCUMENTS

| | | | | |
|---|---|---|---|---|
| 9,836,671 B2 * | 12/2017 | Gao | ........................ | G06F 40/30 |
| 2008/0270361 A1 * | 10/2008 | Meyer | ..................... | G06F 16/38 |
| 2011/0075941 A1 * | 3/2011 | Banno | ..................... | G06F 40/44 382/229 |
| 2017/0201562 A1 * | 7/2017 | Moon | ................... | G06F 16/435 |
| 2018/0373955 A1 * | 12/2018 | Soldevila | ............. | G06F 16/532 |
| 2020/0311123 A1 * | 10/2020 | Ramachandra Iyer | ..................... G06F 16/43 | |

OTHER PUBLICATIONS

Brock,"Large Scale Gan Training for High Fidelity Natural Image Synthesis", Feb. 25, 2019, 35 pages.
Devlin,"BERT: Pre-Training of Deep Bidirectional Transformers for Language Understanding", May 24, 2019, 16 pages.
El,"GILT: Generating Images from Long Text", Jan. 8, 2019, 8 pages.
Erol,"Multimodal Summarization of Meeting Recordings", Aug. 2003, 4 pages.
Faghri,"VSE++: Improving Visual-Semantic Embeddings with Hard Negatives", Oct. 30, 2017, 11 pages.

(Continued)

*Primary Examiner* — Alicia M Willoughby
*Assistant Examiner* — Cheryl M Shechtman
(74) *Attorney, Agent, or Firm* — FIG. 1 Patents (57) ABSTRACT

Content fragments aligned to content criteria enable rich sets of multimodal content to be generated based on specified content criteria, such as content needs pertaining to various content delivery platforms and scenarios. For instance, the described techniques take a set of content (e.g., text, images, etc.) along with a specified content criteria (e.g., business/user need) and creates content fragment variants that are tailored to the content criteria with respect to both the information presented as well as the style of the content presented.

20 Claims, 8 Drawing Sheets

(56) References Cited

OTHER PUBLICATIONS

Gan,"StyleNet: Generating Attractive Visual Captions with Styles", Jun. 2017, 10 pages.
Gatys,"Controlling Perceptual Factors in Neural Style Transfer", May 11, 2017, 9 pages.
Goodfellow,"Generative Adversarial Nets", In: Advances in neural information processing systems (2014), Jun. 10, 2014, 9 pages.
Hussain,"Automatic Understanding of Image and Video Advertisements", Jul. 2017, pp. 1705-1715.
Johnson,"DenseCap: Fully Convolutional Localization Networks for Dense Captioning", Nov. 24, 2015, 10 pages.
Johnson,"Perceptual Losses for Real-Time Style Transfer and Super-Resolution.", Mar. 27, 2016, 18 pages.
Li,"A Closed-form Solution to Photorealistic Image Stylization", Jul. 27, 2018, 23 pages.
Luan,"Deep Photo Style Transfer", Apr. 11, 2017, 9 pages.
Melamud,"A SimpleWord Embedding Model for Lexical Substitution", Jan. 2015, 7 pages.
Mikolov,"Distributed Representations of Words and Phrases and their Compositionality", Oct. 16, 2013, 9 pages.
Nenkova,"Automatic Summarization", Jun. 19, 2011, 133 pages.
Pennington,"GloVe: Global Vectors for Word Representation", EMNLP. vol. 14. 2014., Sep. 2014, 12 pages.
Poels,"How to Capture the Heart? Reviewing 20 Years of Emotion Measurement in Advertising", In the Journal of Advertising Research, vol. 46, Issue 1, Mar. 2006, 48 pages.
Sikka,"Deep Unified Multimodal Embeddings for Understanding both Content and Users in Social Media Networks", Jun. 11, 2019, 20 pages.
Simon,"Entendrepreneur: Generating Humorous Portmanteaus using Word-Embeddings", Dec. 2018, 6 pages.
Srinivasan,"Corpus-based Content Construction", Aug. 26, 2018, pp. 3505-3515.
UzZaman,"Multimodal Summarization of Complex Sentences", Feb. 13, 2011, 10 pages.
Wang,"The Blessings of Multiple Causes", Apr. 15, 2019, 72 pages.
West,"Reverse-Engineering Satire, or "Paper on Computational Humor Accepted despite Making Serious Advances"", Aug. 13, 2019, 8 pages.
Wu,"Learning a Probabilistic Latent Space of Object Shapes via 3D Generative-Adversarial Modeling", Jan. 4, 2017, 11 pages.
Ye,"Advise: Symbolism and External Knowledge for Decoding Advertisements", Jul. 29, 2018, 35 pages.
Zhang,"Equal but Not the Same: Understanding the Implicit Relationship Between Persuasive Images and Text", Jul. 21, 2018, 14 pages.
Zhang,"Self-Attention Generative Adversarial Networks", Jun. 14, 2019, 10 pages.
Zhu,"MSMO: Multimodal Summarization with Multimodal Output", Jan. 2018, pp. 4154-4164.
Zhu,"Toward Multimodal Image-to-Image Translation", Oct. 24, 2018, 12 pages.

\* cited by examiner

CONTENT FRAGMENTS ALIGNED TO CONTENT CRITERIA

BACKGROUND

Multimodal content (e.g., combinations of text, images, video, audio, and so forth) lies at the heart of human interactions and various studies have shown the affinity of humans towards multimodal content. Such content is thus pivotal in delivering the right experience to an end user. Accordingly, multimodal content helps in effective communication of an intended message and this has been heavily leveraged by modern content delivery systems to create compelling and engaging experiences.

Current content generation and delivery systems, however, suffer from a number of challenges. For instance, some current content generation systems are limited to a single content modality and cannot be used for generating coherent multimodal content. While some systems have experimented with generating multiple content modalities, such systems are typically limited to using one type of content (e.g., text) to summarize another type of content, e.g., an image. These techniques are not adaptable to different content needs and do not enable customizable multimodal content experiences to be generated.

SUMMARY

Implementations are described for content fragments aligned to content criteria to enable rich sets of multimodal content to be generated based on specified content criteria, such as content needs pertaining to various content delivery platforms and scenarios. For instance, the described techniques take a set of content (e.g., text, images, etc.) along with a specified content criteria (e.g., business/user need) and creates content fragment variants that are tailored to the content criteria with respect to both the information presented as well as the style of the content presented.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Multimodal content provides rich user experiences that can be adapted for various purposes. Some conventional content generation techniques, however, are typically unable generate content across different modalities. Other content generation techniques that seek to combine modalities are typically limited to content summarization, and fail to provide multimodal content experiences that can be adapted to different content criteria.

Accordingly, techniques for content fragments aligned to content criteria enable rich sets of multimodal content to be generated based on specified content criteria, such as content needs pertaining to various content delivery platforms and scenarios. For instance, the described techniques take a set of content (e.g., text, images, etc.) along with a specified content criteria (e.g., business/user need) and creates content fragment variants that are tailored to the content criteria with respect to both the information presented as well as the style of the content presented.

In an implementation, to initiate generation of content fragments, a set of input content and a content criteria are selected, such as via user input. The set of input content, for example, represents an integrated collection of content such as text and images that pertain to a particular topic. For instance, the input content may be an article about a particular topic taken from a website, such as an article about a geographic location obtained from a travel website. Further, the content criteria can pertain to a particular goal for the content fragments, such as to increase traffic to an online platform, to increase interaction time with content, to increase product conversions, and so forth. The content criteria, for instance, represent attributes of content known to promote a particular goal.

Accordingly, best on the input content, a search query is generated and used to identify visual content (e.g., images, video, etc.) for content fragments. The search query, for instance, is based on text terms extracted from the input content that correlate to the content criteria. The search query is then used to search a corpus of content to extract visual content. Further, text strings are extracted from the input content, such as based on their relevance to the input content as a whole. By combining the visual content and text strings in different ways, fragment candidates are generated. Individual fragment candidates, for instance, represent a combination of text strings extracted from the input content, and visual content obtained via the search query. Further, different semantic relationships between the text strings and the visual content can be utilized to generate varying fragment candidates.

For instance, fragment candidates can be categorized into parallel and non-parallel fragments. Generally parallel fragments are those that convey a similar semantic meaning when presented in individual modalities, and non-parallel fragments are those that present disparate semantic meanings in individual modalities that combine to provide a target meaning that promotes a specified content criteria.

The content criteria is then utilized to identify style transformations to be applied to the fragment candidates to generate content fragments. For instance, a perceptual model is leveraged that is configured to identify, based on the content criteria, perceptual changes that can be made to content of the candidate fragments to better align the candidate fragments to the content criteria. Generally, such changes correspond to style changes to visual and/or textual attributes of the candidate fragments. Accordingly, content of the candidate fragments is adapted based on the identified style changes to generate content fragments that can be used for various purposes. A "content fragment," for instance, represents a combination of information in more than one content modality, such as a combination of text, an image, an animation, video, audio, etc. Generally, content fragments can be delivered to different entities to be used for different purposes, such as for delivery to different users, publishing to an online platform, inserted into other content for publishing and/or broadcast, and so forth.

Accordingly, techniques for content fragments aligned to content criteria described herein overcome limitations of previous techniques by enabling multimodal content from different content sources to be aggregated and combined to provide a variety of different user experiences that align with specified criteria, such as further to content-related goals. Thus, the described techniques represent an improvement over conventional content generation and delivery systems by enabling automated selection and adaptation of criteria-specific content across multiple different content modalities, thus conserving system and user resources required in convention systems that require manual selection and editing of content to conform to specific user needs.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
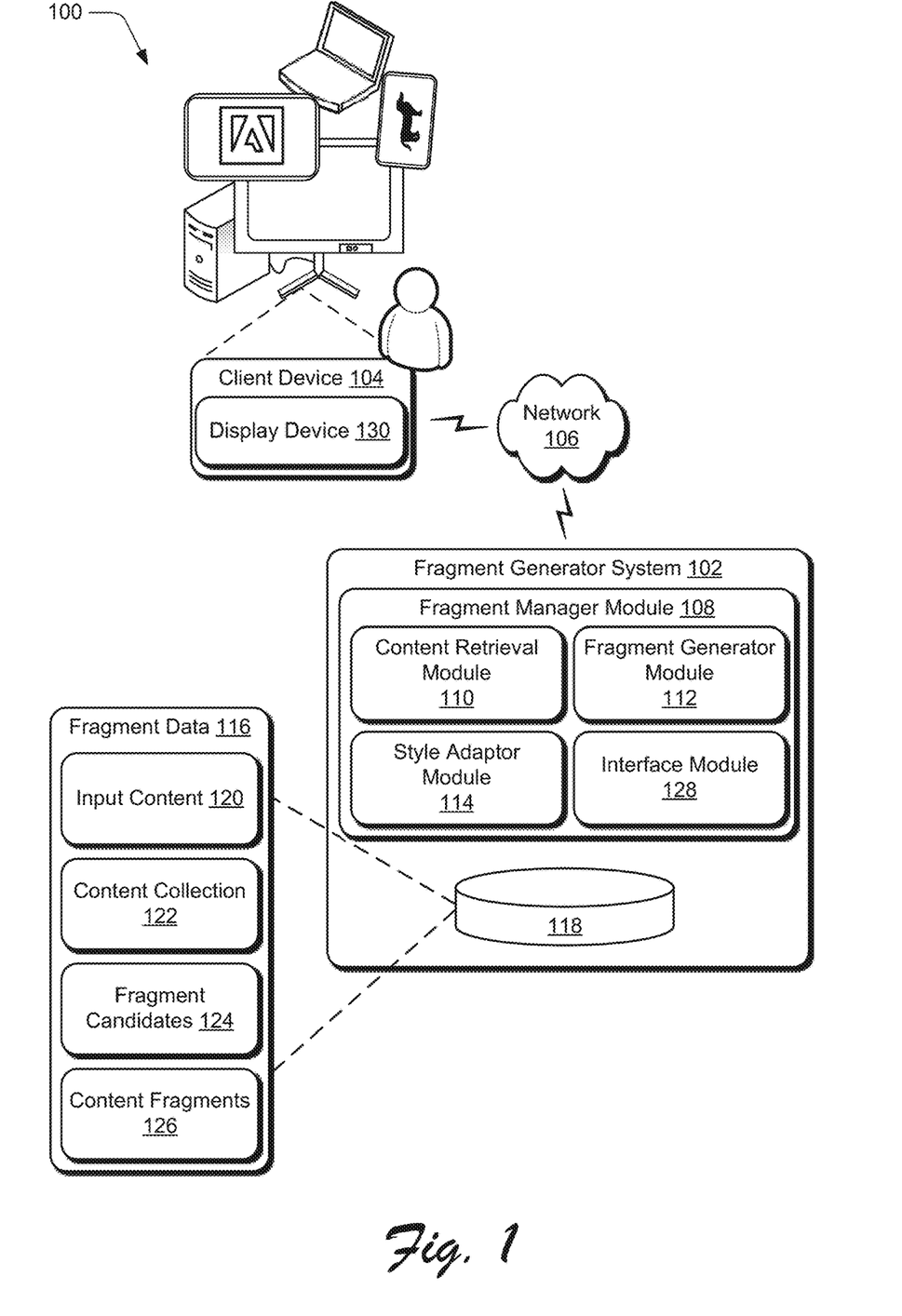
FIG. 1 is an illustration of an environment in an example implementation that is operable to employ content fragments aligned to content criteria techniques described herein.

FIG. 1 is an illustration of an environment 100 in an example implementation that is operable to content fragments aligned to content criteria as described herein. The illustrated environment 100 includes a fragment generator system 102 and a client device 104 that are communicatively coupled, one to another, via a network 106.

Computing devices that are usable to implement the fragment generator system 102 and the client device 104 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 8.

The fragment generator system 102 includes a fragment manager module 108 that is representative of functionality to generate content fragments that align to various content criteria (e.g., needs and/or goals) further to techniques for content fragments aligned to content criteria described herein. Accordingly, the fragment manager module 108 leverages a content retrieval module 110, a fragment generator module 112, and a style adaptor module 114. Generally, the content retrieval module 110 is representative of functionality to retrieve various types of content as part of generating different user experiences. Further, the fragment generator module 112 is representative of functionality to utilize content retrieved by the content retrieval module 110 to generate content fragments that can be adapted for various purposes as part of the different user experiences. The style adaptor module 114 is representative of functionality to adapt style attributes of content, such as content included as part of content fragments generated by the fragment generator module 112.

Accordingly, the enable different user experiences to be generated, the fragment generator system 102 maintains and/or has access to fragment data 116 stored on a storage 118. The fragment data 116 includes various types and instances of data that can be used for generating user experiences, as well as that is output based on the various techniques described herein. In this particular example, the fragment data 116 includes input content 120, a content collection 122, fragment candidates 124, and content fragments 126. Generally, the input content 120 represents different collections of content that the fragment manager module 108 can utilize to initiate the generation of different user experience. The input content 120, for instance, represents collections of multimodal content, such as text, images, audio, video, animations, and so forth. In at least some implementations, instances of the input content 120 are related to particular subject matter (e.g., topics), such as travel, business, education, geography, and so forth, and thus may include collections of content pertaining to particular subject matter.

The content collection 122 represents collections of different instances of content, such as text, images, audio, video, animations, and so forth. The content collection 122, for instance, is searchable utilizing different search queries to retrieve content of interest for various purposes. As further described below, individual instances of content of the content collection 122 can be tagged with various descriptors that describe attributes of the instances, such as keywords that describe objects represented in the content, perceptual attributes of the content (e.g., color, brightness, contrast, etc.), sentiment values for the content (e.g., happy, excited, fashionable, etc.), and so forth.

The fragment candidates 124 represent combinations of instances of content that are obtained from the input content 120 and the content collection 122. For instance, based on different matching criteria, multimodal instances of content can be combined to generate the fragment candidates 124. Further, the style adaptor module 114 can process the fragment candidates 124 to generate the content fragments 126 that convey a particular meaning further to a defined content criteria, such as a specified goal (e.g., business goal) for a set of content. As described in detail below, the style adaptor module 114 can adapt different style attributes of the fragment candidates 124 to generate the content fragments 126, such as visual, textual, audible attributes, and so forth. Thus, the content fragments 126 can be utilized for various purposes to further a stated criteria, such as publishing to a social media platform, email communication, broadcast media (e.g., a television broadcast), print media, and so forth.

The fragment manager module 108 further includes an interface module 128, which is representative of functionality to provide different ways for interfacing with the fragment generator system 102. For instance, the interface module 128 can generate a graphical user interface (GUI) that can be displayed on a display device 130 of the client device 104 to enable user interaction with the fragment generator system 102 to implement aspects of the techniques described herein. Further details and implementations of different aspects of the environment 100 are discussed below.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
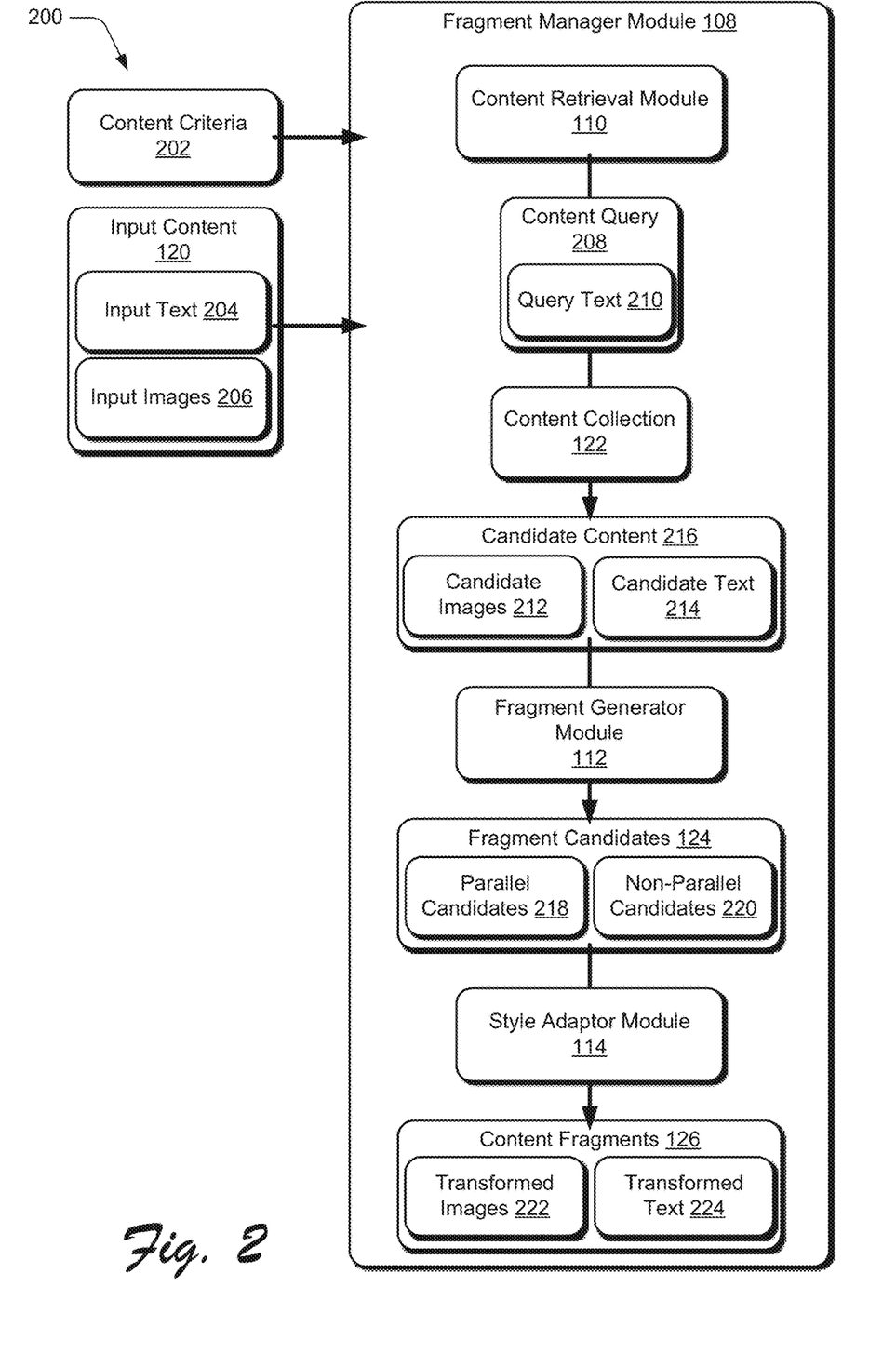
FIG. 2 depicts a system including an overview of techniques for content fragments aligned to content criteria.

FIG. 2 depicts a system 200 illustrating an overview of content fragments aligned to content criteria. In the system 200, content criteria 202 and input content 120 are input to the fragment manager module 108. A user, for instance, interacts with the interface module 128 to select the content criteria 202 and the input content 120. Generally, the content criteria 202 represents a parameter to be used for generating a content object such as a content fragment. The content criteria 202, for instance, represent content attributes known to contribute to a desired content goal, and can be selected from a set of predefined criteria. Alternatively or in addition, a user can specify a particular content goal (e.g., increase content interaction time), and content criteria known to contribute to the content goal can be automatically selected.

In this particular example, the input content 120 includes input text 204 and input images 206, which combine to convey information about particular subject matter. The input content 120, for instance, can pertain to a particular topic. Accordingly, based on the content criteria 202, the content retrieval module 110 generates a content query 208 that can be utilized to search the content collection 122 to suitable instances of content. As described in more detail below, the content retrieval module 110 can search the input text 204 for words known to be associated with the content criteria 202, and can use identified words to generate the query text 210 of the content query 208. The content retrieval module 110 then utilizes the content query 208 to query the content collection 122 to identify and aggregate candidate images 212. Instances of images in the content collection 122, for example, are tagged with various keywords and/or key concepts, and the content retrieval module 110 can obtain the candidate images 212 by matching the query text 210 to tags applied to images of the content collection 122.

The content retrieval module 110 also retrieves candidate text 214 from the input text 204 by comparing individual text strings (e.g., sentences) in the input text 204 to a representation of the average text content of the input text 204 as a whole. As described in more detail below, this can be done by representing the input text 204 as a set of vectors, determining an average vector representation, and selecting the candidate text 214 as text strings that are most similar to the average vector representation. The candidate images 212 and the candidate text 214 are then saved at candidate content 216

Utilizing the candidate content 216, the fragment generator module 112 generates the fragment candidates 124, which include parallel candidates 218 and non-parallel candidates 220. The fragment generator module 112, for instance, combines the candidate images 212 and the candidate text 214 in different ways to generate the fragment candidates 124. Generally, the parallel candidates 218 and the non-parallel candidates 220 represent fragment candidates with differing semantic relationships. For instance, and as explained in more detail below, the parallel candidates 218 exhibit high semantic similarity between respective candidate images 212 and candidate text 214, whereas the non-parallel candidates 220 exhibit lower semantic similarity between their respective candidate images 212 and candidate text 214.

Further to the system 200, the style adaptor module 114 adapts various style attributes of the fragment candidates 124 to generate the content fragments 126. For instance, various visual style features are known to promote conformance with the content criteria 202, and thus can be applied to images in the fragment candidates 124 to generate transformed images 222. Further, various text features (e.g., grammar related) are known to contribute to the content criteria 202, and thus can be applied to text strings in the fragment candidates 124 to generate transformed text 224. Generally, the content fragments 126 maintain the notion of parallel and non-parallel fragments, and enable conceptual features of content of such fragments to be adapted to increase correspondence of the content to the content criteria 202. Accordingly, the transformed content fragments 126 can be delivered for consumption in various ways, such as to a customer for utilization further to an enterprise goal, via publishing to an online platform, display by the client device 104, and so forth.

Figure 3:
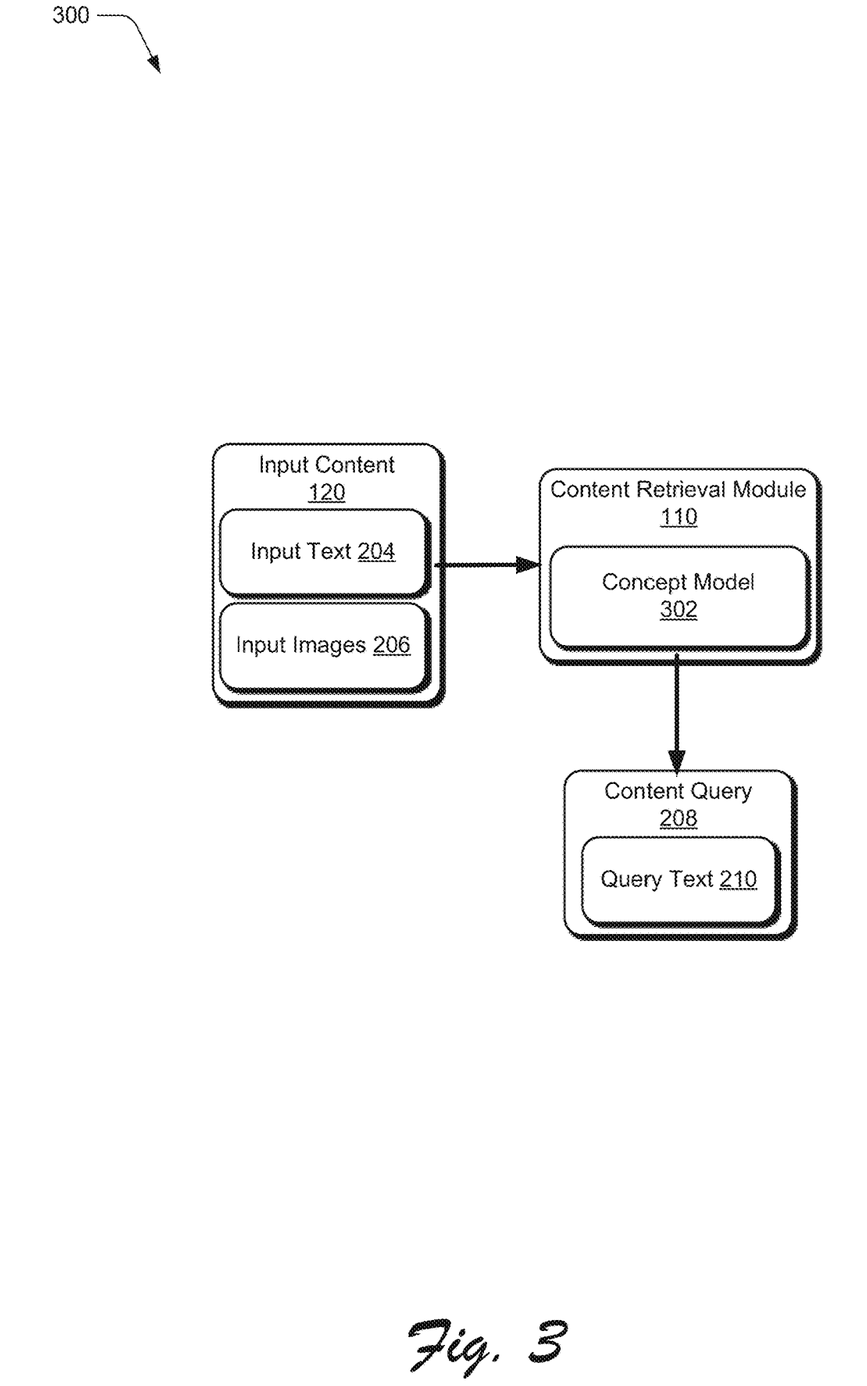
FIG. 3 depicts a system which illustrates further detail concerning generating a content query.

FIG. 3 depicts a system 300 which illustrates further detail concerning generating the content query 208. In the system 300, the content retrieval module 110 leverages a concept model 302 to extract the query text 210 from the input text 204 and generate the content query 208. Generally, the concept model 302 represents a conceptual map-based model indicating the content preferences of a specified content criteria, e.g., the content criteria 202. In at least one implementation, the concept model is generated by extracting key entities and noun phrases from text in the historic fragments to capture the textual concepts. Further, key objects in images of the historical fragments are extracted as image concepts. The concept model 302 is then configured by building a frequency map of the extracted concepts across the fragments that have a desirable performance, e.g. that achieve a target content conversion rate. The identified concept preferences are then utilized by the content retrieval module 110 in tandem with the relevance to the input content 120 in the retrieval stage to generate the query text 210 for the content query 208, which is then executed to extract criteria and input relevant content to initialize generation of the fragment candidates 124.

Figure 4:
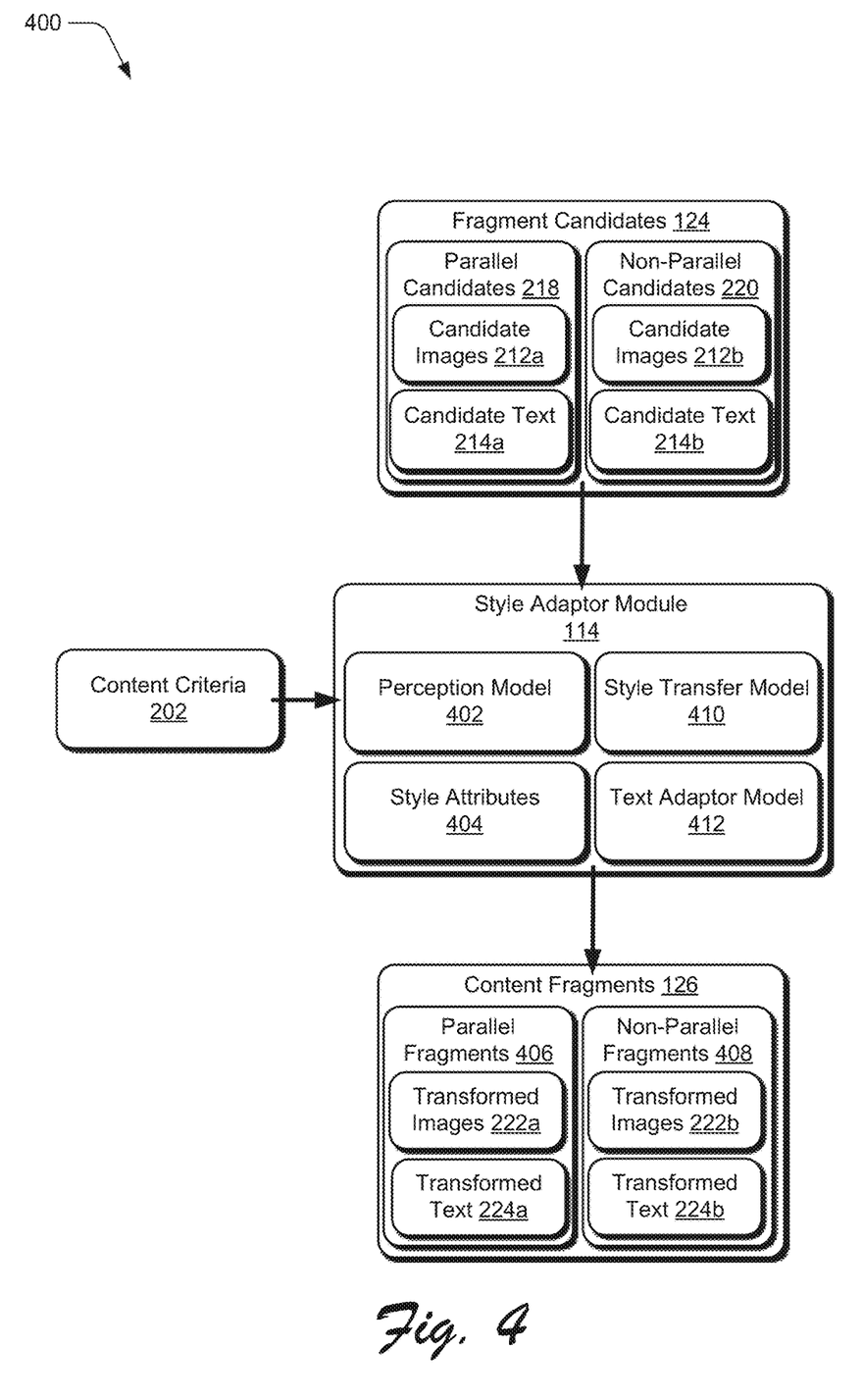
FIG. 4 depicts a system which illustrates further detail concerning generating content fragments.

FIG. 4 depicts a system 400 which illustrates further detail concerning generating the content fragments 126. In the system 400, the style adaptor module 114 utilizes a perception model 402 to identify style attributes 404 of the fragment candidates 124 that are to be adapted based on the content criteria 202. Generally, the perception model 402 is generated by capturing modeled relationships between perceptual attributes of a multimodal fragment and the content criteria (e.g., target user needs), such as by using a causal deconfounding framework. For instance, consider that a particular content criteria seeks fashionable content fragments. Accordingly, the perception model 402 is configured to indicate that a perceived "happiness" of an image results in a more fashionable perception. To configure the perception model, attributes from each of the content modalities (e.g., text, images, audio, and so forth) are extracted—e.g., aesthetics, memorability, happiness, gloominess, scariness of an image, emotions from text, etc. Based on this, for a set of content criteria, the effect of these attributes on the target need is deconfounded to identify top stylistic content preferences for a target content criteria. For instance, while the content remains the same, the style (or the perceptual attributes) of a fragment can be modified to better suit the target need under consideration—a bright image is more elating than a dull one, while the content of the image remains the same; formal text establishes more credulity for the organization than informal text. Further discussion of configuration and operation of the perception model 402 is presented below.

According, the perception model 402 processes the fragment candidates and outputs the style attributes 404 that are to be used for transforming the fragment candidates 124 into the content fragments 126. The parallel candidates 218, for instance, include candidate images 212a and candidate text 214a, which are transformed by the style adaptor module 114 according to the style attributes 404 to generate parallel fragments 406 which include transformed images 222a and transformed text 224a. Further, the non-parallel candidates 220 include candidate images 212b and candidate text 214b, which are transformed by the style adaptor module 114 according to the style attributes 404 to generate non-parallel fragments 408 which include transformed images 222b and transformed text 224b.

To transform the candidate images 212 into the transformed images 222 of the content fragments 126, the style adaptor module 114 leverages a style transfer model 410. Generally, the style transfer model 410 represents a model and/or set of models (e.g., neural networks and/or other machine learning models) that are configured to manipulate digital images or other visual media to adopt a particular appearance or visual style, such as based on another image. The style transfer model 410, for instance, is configured to adapt images to conform to visual aspects specified by the style attributes 404. Generally, this can include manipulating visual attributes such as color, brightness, hue, contrast, and so forth. In at least some implementations, the style adaptor module 114 utilizes a set of different style transfer models 410 that are each configured to perform a different type of style transformation, such as dependent on different style attributes that are identified according to varying content criteria for content fragments.

Further, to transform the candidate text 214 into the transformed text 224, the style adaptor module 114 leverages a text adaptor model 412. Generally, the text adaptor model 412 is configured to conform words and/or sections of text to various style attributes. For instance, the text adaptor model 412 utilizes seed words that span across several stylistic dimensions, such as words which are synonyms but stylistically they can be put into different buckets. For example, buckets can be defined based on words that are subjective and objective. Other buckets may be defined for formal and informal words that are synonyms. To conform text to a particular style, for instance, the text adaptor model 412 looks for synonyms of a word in a different bucket, to change the overall style of the text.

For example, consider that the style attributes 404 specify that text content is to be transformed to be more formal, such as to increase its alignment with a "fashionable" content criteria. The formality of the text, for instance, is a causally significant attribute which contributes to fashionable alignment of text. Accordingly, the text adaptor model 412 looks for words which are synonyms of words that exist in the current version of the text, but are more formal. The text adaptor model 412, for instance, maintains a list of formal words and informal words, and can replace an informal word in text with a more formal word synonym, and vice versa. The text adaptor model 412 can perform replacements for other text style concepts such as objective/subjective, neutral/colloquial, abstract/concrete, etc. Further, these stylistic dimensions can be tuned by changing the words using their synonyms.

Accordingly, the style adaptor module 114 generates the content fragments 126, which can then be utilized for various purposes further to the content criteria 202.

Consider now a discussion of example ways for configuring and training the perception model 402. To capture the stylistic preferences for various content criteria, relations between image and text attributes and the target content criteria are characterized using a causal deconfounding model. For instance, starting with a corpus of fragments (and their stylistic attributes X) along with their performance on the target criteria (Y), a logistic regression model is built that models $p(Y=1)=W^T X$, where $p(Y=1)$ represents the probability that the input attributes indicate the target criteria. Once the perception model 402 has been trained, it can use a learned weight matrix to determine correlations between the various attributes and the target criteria. However, these attributes might be confounding each other's effect on the overall criteria. To overcome the issue of confounding attributes, a Causal Deconfounder model is utilized, such as described by Wang, Yixin, and David M. Blei. "The Blessings of Multiple Causes." *arXiv preprint arXiv*: 1805.06826 (2018).

Accordingly, utilizing such as model, a latent matrix Z is learned from X using a standard Probabilistic Principal Component Analysis (PPCA) model, and a logistic regression is applied on the concatenated matrix $(X \oplus Z)$. The latent matrix Z acts as a substitute confounder, thus eliminating other implicit confounding effects. Since the confounding effects are eliminated, remaining relations identified by the perception model 402 between content attributes and target criteria represent not mere correlations but causations. Generally, X includes attributes from both image and text in a fragment and quantifies the (a) aesthetics, memorability, happiness, gloominess, scariness of images and (b) anger, anticipation, disgust, fear, joy, sadness, surprise, trust, specificity, positivity for text. The causal deconfounding model utilized to configure the perception model 402 helps in establishing causal relations between these stylistic attributes towards a certain target criteria and also, their extent. These causal relations are leveraged to modify image or text attributes (e.g., to generate the style attributes) in order to attain better stylistic alignment with the target criteria.

Figure 5:
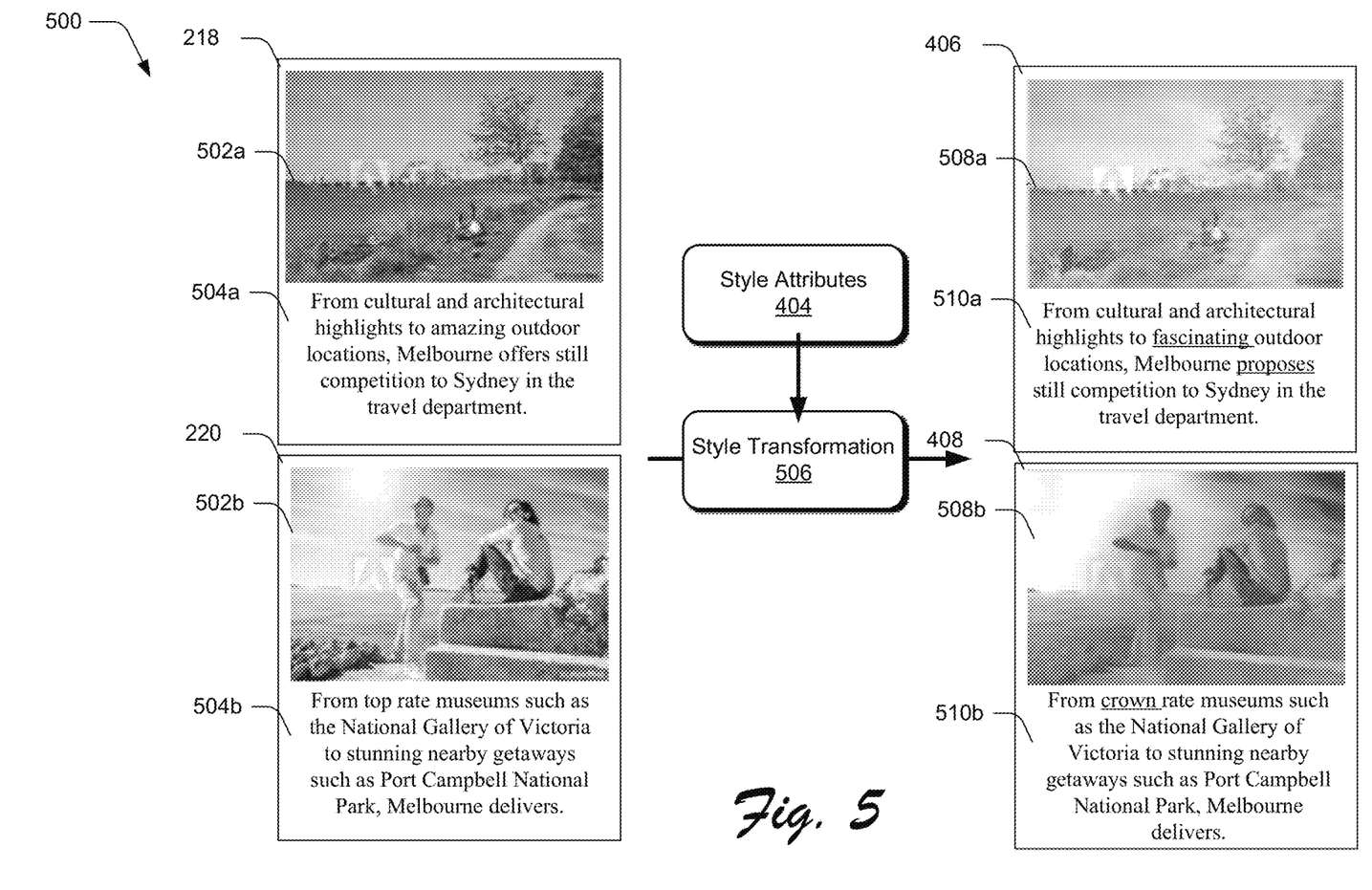
FIG. 5 depicts a scenario for generating content fragments.

FIG. 5 depicts a scenario 500 for generating content fragments according to techniques described herein. The scenario 500 includes fragment candidates 124, including a parallel candidate 218 and a non-parallel candidate 220. Further, the parallel candidate 218 includes a candidate image 502a and candidate text 504a, and the non-parallel candidate 220 includes a candidate image 502b and candidate text 504b. In at least one implementation, the candidate text 504a, 504b represent text strings taken verbatim from the input text 204. Generally, the parallel fragment 218 and the non-parallel fragment 220 differ based on semantic alignment between their respective images and text. For instance, the candidate image 502a and the candidate text 504a of the parallel fragment 218 are semantically aligned, e.g., both invoke a similar semantic meaning. However, the candidate image 502b and the candidate text 504b of the non-parallel fragment 220 have differing semantic meanings, e.g., are semantically misaligned. Ways for generating parallel and non-parallel fragments are discussed below.

The style attributes 404 are utilized by the style adaptor module 114 to perform a style transformation 506 of the fragment candidates 124 to generate a parallel fragment 406 and a non-parallel fragment 406. For instance, the candidate image 502a is transformed based on the style attributes 404 to generate a transformed image 508a, and the candidate text 504a is transformed to generate the transformed text 510a. As illustrated, various visual attributes of the candidate image 502a are transformed in the transformed image 508a, such as color and brightness. Generally, this transformation can be made to improve a "happy" perception in the fragment image, which represents an image attribute identified to improve alignment with a particular content criteria. Further, the candidate text 504b is transformed to generate the transformed text 510a by replacing various terms, which in this case includes replacing the term "amazing" with "fascinating," and "offers" with term "proposes." In at least one implementation, this increases the "formal" tone of the text to improve alignment with the particular content criteria.

Further to the scenario 500, as part of transformation of the non-parallel candidate 220, the candidate image 502b is transformed based on the style attributes 404 to generate the transformed image 508b, and the candidate text 504b is transformed to generate the transformed text 510b. As illustrated, various visual attributes of the candidate image 502b are transformed in the transformed image 508b, such as color and contrast. Generally, this transformation can be made to improve a "memorable" perception in the fragment image, which represents an image attribute identified to improve alignment with a particular content criteria. Further, the candidate text 504b is transformed to generate the transformed text 510b by replacing various terms, which in this case includes replacing the term "top" with "crown." In at least one implementation, this increases the "positive" tone of the text to improve alignment with the particular content criteria.

Accordingly, while various attributes of the fragment candidates 124 are transformed to generate the content fragments 126, the content fragments 126 maintain their relative parallel/non-parallel relationships between their respective content.

Figure 6:
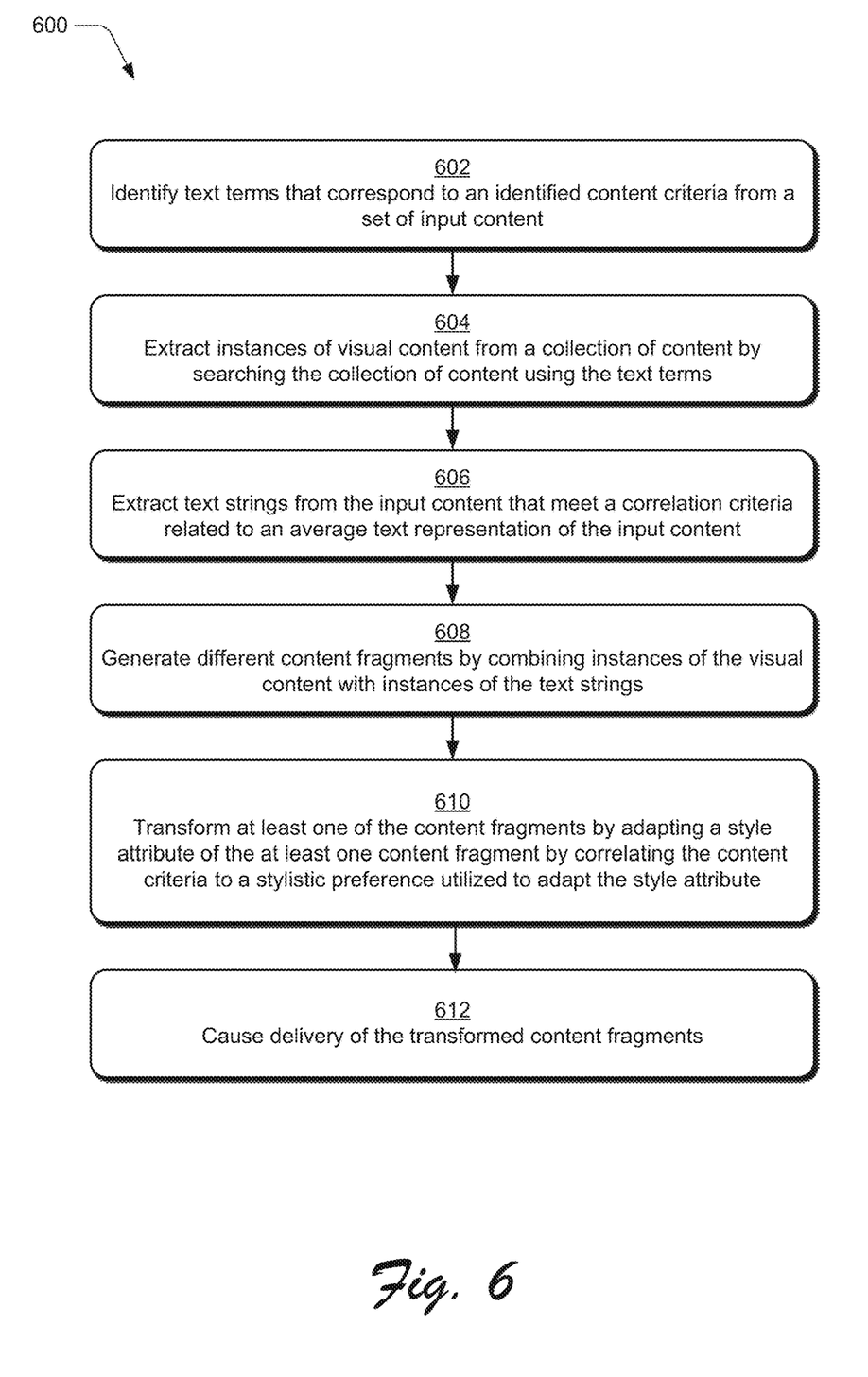
FIG. 6 depicts a procedure in an example implementation for generating content fragments.

FIG. 6 depicts a procedure 600 in an example implementation for generating content fragments, such as using the fragment generator system 102 as described above. Step 602 identifies text terms that correspond to an identified content criteria from a set of input content. A user, for instance, inputs a set of content (e.g., text and images) and identifies a desired content criteria for generating content fragments. Accordingly, the content retrieval module 110 generates a content query from the input set of content.

In an example implementation, keywords to be used for query are extracted from input text content based on their frequency in the input content, and the top-n keywords are extracted to construct the query. The choice of top-n keywords, for example, is biased by giving a relatively higher importance to words that symbolize a concept aligned with an identified content criteria. A query is then generated using a combination of k (k<n) words from the extracted words—such that the interterm coherence and inter-query diversity of the query is high.

For instance, a total of 15 words (i.e., k=15) are selected from the input text content, which are a combination of words in the input content that are often used in a symbolic sense and frequent words in a corpus (e.g., the content collection 122) and based on term frequency—inverse document frequency (tf-idf) scores. Potential 3-word queries are then constructed by simply combining the three words with space as a delimiter—a total of $^{15}C_3$ combinations are possible. Of the $^{15}C_3$ combinations, the top 20 queries that have high inter-word similarity in terms of word2vec embeddings (i.e., query-coherence score) are kept while the others are dropped. Furthermore, to ensure inter-query diversity, 5 queries are chosen from the set of 20 coherent queries that have highest Levenshtein score (a quantification of character-level edit distance between two strings). Explicitly incorporating measures for diversity ensures that retrieved images are diverse and there is a larger pool to choose from in the later stages of the fragment generation pipeline.

Step 604 extracts instances of visual content from a collection of content by searching the collection of content using the text terms. The content retrieval module 110, for instance, searches the content collection 122 utilizing the generated query to identify images for use in generating content fragments.

Step 606 extracts text strings from the input content that meet a correlation criteria related to an average text representation of the input content. The content retrieval module 110, for instance, characterizes the input content as a whole, and then extracts text strings (e.g., sentences) that correspond to an average representation of the text content as a whole. For instance, sentences of the input text content are encoded using a sentence encoder, and a top 5 sentences based on the similarity to the average sentence embedding of the input content.

Step 608 generates different content fragments by combining instances of the visual content with instances of the text strings. The fragment generator module 112, for instance, combines the candidate images 212 with the candidate text 214 to generate the fragment candidates 124. Further, the fragment candidates 124 are generated to include parallel candidates 218 and non-parallel candidates 220. Examples ways for generating various candidates are described below Step 610 transforms at least one of the content fragments by adapting a style attribute of the at least one content fragment by correlating the content criteria to a stylistic preference utilized to adapt the style attribute. As described above, for instance, the style adaptor module 114 leverages the perception model 402 to generate style attributes 404 that correlate to a particular content criteria. The style attributes 404 are then utilized to transform content of candidate fragments (e.g., images, text, etc.) to generate content fragments.

In at least one implementation, the perception model 402 is applied to various fragment initializations based on the need-based ranking to obtain the criteria-adapted fragments. For instance, for every candidate fragment, an attribute matrix X is calculated and the perception model 402 is utilized to identify style attributes to improve upon for an identified content criteria. Generally, the difference between desired attribute vector, which is $X=(W^+)T^Y$ and the actual attribute vector X is used to identify the attributes that are to be tuned in order to achieve better alignment with the target criteria Y. For instance, let this set of attributes be A={$a_1$, $a_2$, ..., $a_k$}. Based on the attributes determined to be improved by the perception model 402, a style-transfer for the particular attribute is applied the corresponding image or text component to improve the attribute in the variant. Further, if there are multiple attributes identified by the perception model 402, the top attributes of each content modality can be utilized.

For example, consider that the perception model 402 indicates the improvement of aesthetics, memorability and happiness in image, and positivity in text to better tailor to the target criteria. Since simultaneous style attribute transfer may be prohibitive, attributes for transfer can be identified as <aesthetics of image and positivity of text>, <memorability of image and positivity of text> and <happiness of image and positivity of text> to create 3 variants. For each of these variants, a predictor score for the target need is computed from the trained perception model 402 which can be used to identify a highest scoring combination among these, and/or these attributes can be ranked. More generally, for individual variants improved on the identified attribute, we extract their attributes $X_v$ and compute their need score $W^T X_v$ based on the trained perception model 402 $W^T$ for the target criteria, and pick the variant that maximally improves on the target criteria and/or use it to rank the variant.

Step 612 causes delivery of the transformed content fragments. The content fragments 126, for instance, can be output for viewing, transmitted to other entities, published to an online platform, and so forth.

Figure 7:
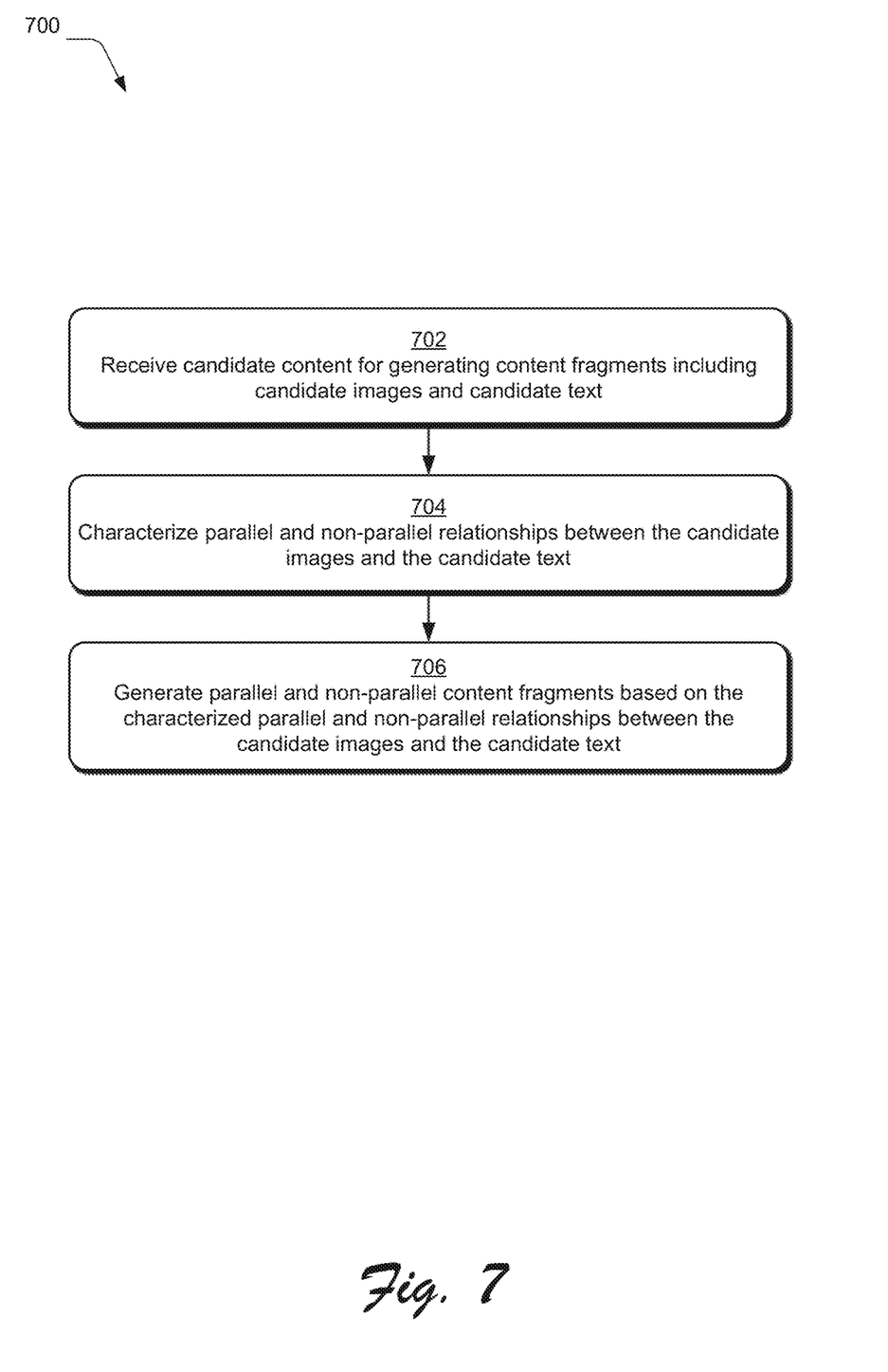
FIG. 7 depicts a procedure in an example implementation for generating parallel and non-parallel content fragments.

FIG. 7 depicts a procedure 700 in an example implementation for generating parallel and non-parallel content fragments, such as using the fragment generator system 102 as described above. The procedure 700, for instance, may be implemented in conjunction with the procedure 600 detailed above.

Step 702 receives candidate content for generating content fragments including candidate images and candidate text. The fragment generator module 112, for instance, receives the candidate content 216 including the candidate images 212 and the candidate text 214.

Step 704 characterizes parallel and non-parallel relationships between the candidate images and the candidate text. For instance, combinations of image-text pairs, are ranked on a parallel to non-parallel spectrum by sorting on the basis of similarity between VSE++ embeddings of an image and a text string. See, e.g., Faghri, Fartash, et al. "Vse++: Improving visual-semantic embeddings with hard negatives." arXiv preprint arXiv:1707.05612 (2017). In addition to ranking on parallelism, criteria alignment and relevance to input content are maintained. Therefore, along with parallelism, a need-based relevance score is utilized for ranking of candidate fragments, to ensure that the fragments are well representative of the input content and aligned to target criteria. Accordingly, a net relevance score, $R_{net}$ is defined as a combination of (a) parallel-ness and non-parallel-ness score ($R_{p/np}$), (b) relevance of the text and image to the input content ($R_t$ and $R_i$ respectively) and (c) how strongly the fragment demonstrates affiliation to a certain criteria ($N_t$ and $N_i$ respectively).

$$R_{net} = \alpha |R_{p/np}| + (1-\alpha)\frac{R_t \|N_t\| + R_i \|N_i\|}{2}$$

For text, relevance is computed using cosine similarity between the current sentence embedding and the input content embedding. For images, the relevance is computed using cosine similarity between the embeddings of the image tags and the input document embedding. $N_t$ and $N_i$ are need vectors of the text and image in the fragments, respectively. The criteria vectors capture the alignment of a particular image or text with a given criteria and are computed using conceptual-word overlaps, e.g., if a certain concept-word occurs in a sentence (or image), it has high alignment with the associated criteria in S→N matrix. In effect, $R_{net}$ quantifies the relevance of an image-text pair with (a) the given input given an (b) target need—both of which are important to be considered in order to obtain optimum initializations of fragments.

To summarize, to generate parallel and non-parallel fragments are maintain relevance to input content, $R_{p/np}$ is defined as the parallel/non-parallel score based on cosine similarity between image and text embeddings in a visual semantic embedding space. By definition, $R_{p/np}$ is positive for parallel fragments and negative for non-parallel fragments. Further, we can choose top parallel (i.e., $R_{p/np}>0$) and top non-parallel (i.e., $R_{p/np}<0$) fragments with high net relevance scores ($R_{net}$). Accordingly, by the end of this step parallel and non-parallel initialization of multimodal fragments is achieved that are both related to a target criteria and input content.

Step 706 generates parallel and non-parallel content fragments based on the characterized parallel and non-parallel relationships between the candidate images and the candidate text. For instance, content fragments 126 are generated based on the top parallel and non-parallel fragments identified above. The identified parallel and non-parallel multimodal fragments can then be utilized for generating finalized fragments, such as by transforming the fragments based on different style attributes discussed above.

Accordingly, techniques for content fragments aligned to content criteria enable highly relevant multimodal content fragments to be generated that are tailored to specific defined content criteria (e.g., various content needs and goals), which is not possible using convention techniques.

Example System and Device

Figure 8:
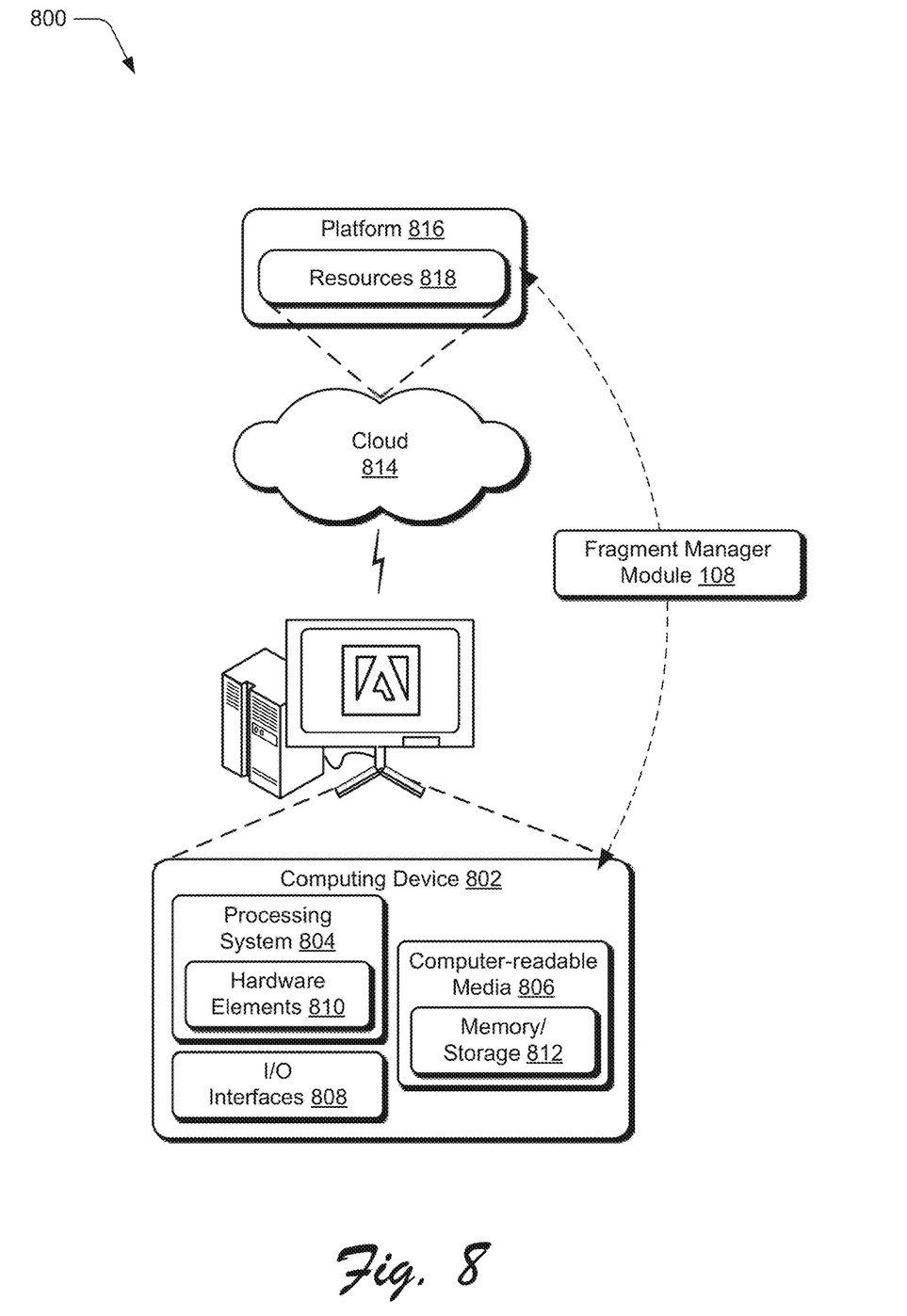
FIG. 8 illustrates an example system including various components of an example device that can be implemented as any type of computing device as described and/or utilized with reference to FIGS. 1-7 to perform implementations of techniques described herein.

FIG. 8 illustrates an example system generally at 800 that includes an example computing device 802 that is representative of one or more computing systems and/or devices that may implement the various techniques described herein. This is illustrated through inclusion of the fragment manager module 108. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   identifying, by the at least one computing device, text terms that correspond to an identified content criteria from a set of input content;
   extracting, by the at least one computing device, instances of visual content from a collection of content by searching the collection of content using the text terms;
   extracting, by the at least one computing device, text strings from the input content that meet a correlation criteria related to an average text representation of the input content;
   generating, by the at least one computing device, different content fragments by combining instances of the visual content with instances of the text strings; and
   transforming, by the at least one computing device, at least one of the content fragments by adapting a style attribute of the at least one content fragment by correlating the content criteria to a stylistic preference utilized to adapt the style attribute, including:
      comparing a visual attribute and a textual attribute of a particular content fragment to the content criteria to determine a relative alignment of the visual attribute and the textual attribute to the content criteria;
      determining a visual modification to the visual attribute and a text modification to the textual attribute applicable to increase alignment of the visual attribute and the textual attribute to the content criteria; and
      transforming visual content of the particular content fragment including to modify the visual attribute of the visual content according to the visual modification, and transform text content of the particular content fragment including to modify a text string of the particular content fragment according to the text modification.

2. The method as described in claim 1, wherein the content criteria is based on a specified goal for the content fragments.

3. The method as described in claim 1, wherein said extracting instances of visual content from the collection of content comprises generating a set of queries that correspond to different combinations of the text terms, and said searching utilizes the different combinations of the text terms.

4. The method as described in claim 1, wherein the text terms are identified utilizing a model that maps term concepts to different content criteria.

5. The method as described in claim 1, wherein said extracting the text strings comprises representing, by the computing device, text content of the input content as an encoded text embedding, and selecting the text strings based on their similarity to an average text embedding of the text content.

6. The method as described in claim 1, wherein said generating the different content fragments includes calculating a relevance score that characterizes relevance to the input content and alignment with the content criteria, and selecting the content fragments based on their respective relevance score.

7. The method as described in claim 1, wherein said extracting text strings includes generating a set of text vectors from text content extracted from the input content, determining an average vector representation from the set of text vectors, and selecting the text strings from the text content based on similarity of respective text vectors to the average vector representation.

8. A system implemented at least in part of hardware of at least one computing device, the system comprising:
   a content retrieval module to:
      identify text terms that correspond to an identified content criteria from a set of input content and extract instances of visual content from a collection of content by searching the collection of content using the text terms; and
      extract text strings from the input content that meet a correlation criteria related to an average text representation of the input content;
   a fragment generator module to generate different content fragments by combining instances of the visual content with instances of the text strings; and
   a style adaptor module to transform the content fragments by adapting a style attribute of the content fragments by correlating the content criteria to a stylistic preference utilized to adapt the style attribute, including to:
      compare a visual attribute and a textual attribute of a particular content fragment to the content criteria to determine a relative alignment of the visual attribute and the textual attribute to the content criteria;
      determine a visual modification to the visual attribute and a text modification to the textual attribute applicable to increase alignment of the visual attribute and the textual attribute to the content criteria; and
      transform visual content of the particular content fragment including to modify the visual attribute of the visual content according to the visual modification, and transform text content of the particular content fragment including to modify a text string of the particular content fragment according to the text modification.

9. The system as described in claim 8, wherein the content retrieval module is further implemented to identify the text terms by utilizing a concept model that maps different concepts pertaining to the content criteria to corresponding text terms.

10. The system as described in claim 8, wherein the average text representation comprises a text embedding generated by encoding the text content of the input content.

11. The system as described in claim 8, wherein the fragment generator module is further implemented to combine instances of the visual content with instances of the text strings to generate a parallel content fragment that exhibits semantic alignment between an instance of visual content and a respective text string, and a non-parallel content fragment that exhibits semantic differences between an instance of visual content and a respective text string.

12. The system as described in claim 11, wherein the fragment generator module is further implemented to generate the content fragments based on a score that characterizes a relative parallelness of individual content fragments, and a relevance of the content fragments to the set of input content.

13. The system as described in claim 12, wherein the score further characterizes alignment of the content fragments to the content criteria.

14. The system as described in claim 8, wherein to extract the text strings includes to generate a set of text vectors from text content extracted from the input content, determine an average vector representation from the set of text vectors, and select the text strings from the text content based on similarity of respective text vectors to the average vector representation.

15. One or more computer-readable storage media storing instructions that are executable to perform operations comprising:
    extracting, by at least one computing device, instances of visual content from a collection of content by searching the collection of content using text terms from a set of input content that correspond to an identified content criteria;
    extracting, by the at least one computing device, text strings from the input content that meet a correlation criteria related to an average text representation of the input content;
    generating, by the at least one computing device, a content fragment by combining an instance of the visual content with an instance of the text strings; and
    transforming, by the at least one computing device, the content fragment by adapting a style attribute of the text string instance based on a text stylistic preference for the content criteria, and adapting a style attribute of the visual content instance based on a visual stylistic preference for the content criteria, including:
        comparing a visual attribute and a textual attribute of a particular content fragment to the content criteria to determine a relative alignment of the visual attribute and the textual attribute to the content criteria;
        determining a visual modification to the visual attribute and a text modification to the textual attribute applicable to increase alignment of the visual attribute and the textual attribute to the content criteria; and
        transforming visual content of the particular content fragment including to modify the visual attribute of the visual content according to the visual modification, and transform text content of the particular content fragment including to modify a text string of the particular content fragment according to the text modification.

16. The one or more computer-readable storage media as described in claim 15, wherein said extracting the instances of visual content utilizes a search query using the text terms, and wherein the operations further comprise selecting the text terms by prioritizing terms that symbolize a concept aligned with the identified content criteria.

17. The one or more computer-readable storage media as described in claim 15, wherein said generating the content fragment comprises selecting the content fragment based on a score that quantifies a relevance of the content fragment to the input content, and an alignment of the content fragment to the identified content criteria.

18. The one or more computer-readable storage media as described in claim 15, wherein said generating the content fragment comprises selecting the content fragment based on a score that quantifies a semantic alignment between the instance of the visual content and instance of the text string.

19. The one or more computer-readable storage media as described in claim 15, wherein said extracting text strings includes generating a set of text vectors from text content extracted from the input content, determining an average vector representation from the set of text vectors, and selecting the text strings from the text content based on similarity of respective text vectors to the average vector representation.

20. The one or more computer-readable storage media as described in claim 15, wherein one or more of:
    said modifying the text string according to the text modification comprises replacing a text term in the text string with a different text term; or
    said modifying the visual content according to the visual modification comprises modifying a color attribute of the visual content.

* * * * *